Patented Jan. 23, 1940

2,187,718

UNITED STATES PATENT OFFICE 2,187,718

RICE PRODUCT AND PROCESS

Paul C. Wilbur, San Jose, Calif.

No Drawing. Application June 22, 1938,
Serial No. 215,229

12 Claims. (Cl. 99—186)

My invention relates to food products and processes, and is concerned more particularly with the canning of cooked rice products, as, for example, a rice product incorporating a fruit such as fruit rice pudding. This application is a continuation in part of my co-pending application, Serial No. 162,766, filed September 7, 1937.

Heretofore, the canning of products containing rice has not been accomplished successfully because the alkaline character of such rice products has necessitated the use of pressure processes to obtain the temperatures (above 212° F.) essential to sterilization, and such pressure processes result in excessive discoloration of the rice, physical breakdown of the rice grains, and severe matting of the product in its container. These results render the product markedly inferior to that prepared by ordinary kitchen methods, and there has been substantially no commercial use of rice as a canned product. Also, it has been found that canned rice grains tend to harden progressively after packing, sometimes becoming excessively hard within two months, and to show the development of distinct hard granules within the grain, so that its value as a commercial product is seriously impaired and sometimes destroyed. In addition, canned rice tends to solidify into a single mass in which the individual rice grains lose their identity.

In accordance with my invention, the above-noted difficulties are overcome by placing in the rice product an ingredient of special character which enables successful canning and sterilizing of the canned product without causing any of the above-noted disadvantageous results.

It is a general object of my invention to provide a successful process for canning cooked rice.

Another general object of my invention is to provide a new cooked rice product.

Another general object of my invention is to provide a new cooked rice product in which the grains will not harden, or granulate during storage.

A further object of my invention is to provide a new rice and fruit product and a process for canning the product.

Other objects will appear from the following description of a preferred form of the product, and a preferred manner of carrying out the process for producing the product.

In the canning art, it is customary to employ pressure processes at temperatures above the boiling temperature of water (212° F.) in sterilizing any canned product having low acidity, such as rice, for example. On the other hand, with fruit and vegetable products of an acidity above a certain minimum value (pH below 4.5), boiling water processes can be used successfully for sterilizing. As considered from the standpoint of time of sterilization, at any given temperature the time required for sterilization of a non-acid product (above pH 4.5) is many times greater than the time required for sterilization of an acid product (below pH 4.5).

I have discovered that by proper treatment of rice together with an edible acid ingredient, a rice product is obtained which will permit sterilization by boiling water processes, that is, at or below 212° F., without deleterious effects on the rice such as those mentioned above.

A preferred treatment may comprise cooking rice in the acid ingredient so that the resulting composition will have an acidity after cooking to permit sterilization by boiling water processes. I prefer to employ a buffered acid ingredient such as a fruit of high acidity, or, for example, a mixture of citric acid with di-sodium phosphate or sodium citrate, so that a slower and more uniform reaction is obtained between the acid ingredient and the starch. Fruit pulp is considered to be a highly advantageous form of acid ingredient because it not only provides a buffered acid in a readily obtainable form and results in a desirable food product, but also provides bulk particles tending to resist matting of the rice grains. Although a buffered acid ingredient obtains improved results, unbuffered acid solutions can be used satisfactorily.

By pre-cooking the rice with the acid ingredient, certain changes will occur within the rice grains which will prevent or greatly reduce their subsequent hardening or granulation and their tendency to solidify into a single mass during storage.

In preparing the product, the quantity of rice must be so adjusted as to give sufficient body to the product to prevent any of the ingredients settling to the bottom of the can, while at the same time, the proportion of the rice to the acid ingredient must be such as to maintain the acidity above a minimum vale, i. e., the pH value should not be over 4.5 after sterilization is completed.

To meet the above requirements, I have found that a percentage of dry rice between 9% and 12% by weight (the equivalent of a percentage of cooked rice of between 40% and 52% by weight), and a percentage of acid ingredient, such as the pulp of apricots, peaches, pears, berries, or plums, of between 30% and 40% give a satisfactory consistency while maintaining the acidity above the critical minimum value. The rice alone and in the mixture at the beginning of the pre-cooking operation is neutral or slightly alkaline. During the pre-cooking an equalization of acidity takes place resulting in a substantially uniform average acidity at the end of the pre-cook.

In the case of over-ripe fruits having a natural lower acidity the percentage of pulp should be increased enough to compensate for the over-ripe condition. Other fruits can be employed, if desired, as well as any edible product containing a preponderance of edible acids, such as malic, citric, tartaric, lactic or acetic acids. Any desired flavoring ingredients may be added, such as sugar, salt, spices, and the like.

A preferred formula for an apricot rice pudding is:

|  | Per cent |
| --- | --- |
| Washed rice | 9.2 |
| Apricot pulp | 35.8 |
| Sugar | 14 |
| Seedless raisins | 4 |
| Salt | 0.2 |
| Water | 36.8 |

In preparing the product, the rice is first washed well and drained. The washed, uncooked rice is then added to the acid ingredient which has been brought to the boiling point. As noted above, the acid ingredient is preferably a fruit pulp in which the desired flavoring ingredients, such as sugar and salt, have been dissolved. After addition of the rice, the boiling of the mixture is continued until the rice grains have been thoroughly softened and gelatinized, a boiling period of from 12 to 30 minutes being used, depending upon the degree of acidity of the acid ingredient and its proportion relative to the rice.

During the boiling operation both the extracted starch and that remaining in the grains has its character modified. A considerable portion of the starch extracted from the rice grains is inverted to dextrins by the action of the acid ingredient, and as a result has its property of setting up or jelling after cooling substantially modified so as to prevent solidification of the separate grains in a single mass, while at the same time its nutritive constituents are retained in a desirable form. During the boiling, a part of the acid enters or is absorbed by the rice grains and modifies the character of the starch therein in the same manner. Although the proportion of partially inverted starch within the grains may be less than that of the extracted starch because of the more restricted amount of acid absorbed by the grains, the starch transformation is sufficient to prevent the deleterious granulation and hardening of the rice grains which otherwise occurs during storage.

It is well known that the extent of the inversion of starch by an acid ingredient is determined by the proportion of starch, the proportion and strength of the acid, and the total time and temperature of heating. In my process, the use of a well buffered acid ingredient, such as fruit pulp, having an initial pH of about 3.6 or above and giving a final pH in the mixture after boiling and processing, of about 4.1, does not result in the formation of any significant quantity (i. e. less than 1% or 2%) of reducing sugar from the starch, but does cause sufficient formation of dextrins and modification of the starch to prevent the undesirable granulation and hardening of the rice grains described above. The same result may be obtained by using weak unbuffered solutions of edible acids of a strength to provide a pH of not over 4.5 at the end of the sterilizing operation. However, the use of excessively strong solutions of edible acids or mineral acids will cause the formation of undesirably high percentage of simpler dextrins and glucose, so as to interfere with the swelling of the rice grains, and to provide an undesirably low viscosity so that the product will not set up or jell properly.

At the end of the pre-cooking operation, the resulting hot mixture is filled into cans, this operation being preferably done quickly to avoid loss of heat, and is subsequently sterilized at a temperature not exceeding 212° F., the time required for sterilization being in the normal range used for acid products, taking into account the high temperature of filling. As pointed out above, during the pre-cooking and sterilizing operations a transfer of acidity occurs so that all the ingredients have a uniform average acidity at the end of the sterilization operation. The resulting product will keep safely without granulation and the rice grains remain separate and distinct.

The desired result may also be obtained by reducing the boiling time before filling, filling the hot mixture quickly into cans to avoid loss of heat and extending the cooking of the product in the can for an additional time to compensate for the shorter pre-cooking time. However, it is practically very difficult to fill the can with product without material reduction in temperature of the product. The desired changes of the extracted starch and starch within the rice grains proceeds more slowly at lower temperatures, in conformity with ordinary chemical reactions. Because of the extremely slow rate of penetration of heat from the cooking vat into the container of the product, extreme extensions of the cooking time are necessary to return the temperature of the product in the container to a range where the desired change in character of the rice starch will occur. Also, incompletely pre-cooked rice has a marked tendency to settle during heating in the container, although any excessive settling of the rice grains can be avoided by mechanical agitation of the container during cooking.

Where the canned product will be used within a short time, that is, within about two months so that no granulation or hardening will have occurred, the treatment may be modified by mixing cooked rice with the acid ingredient in proportions to maintain the acidity above a minimum value, i. e., the pH should not be over 4.5 after sterilization is complete. In accordance with this modified process a percentage of cooked rice, between 40% and 52% by weight, and a percentage of the acid ingredient of between 30% and 40%, gives a satisfactory consistency while maintaining the acidity above the critical minimum value. The rice alone and in the mixture at the beginning of the sterilizing process is nearly neutral (pH about 7.1), and during the process an equalization of acidity takes place resulting in a uniform average acidity at the end of the process.

In preparing the product in accordance with the modified treatment, the rice is first washed well and then boiled in a large quantity of water until the grains are thoroughly swelled and cooked. The water is then drained from the rice, which is mixed in any convenient manner with the acid ingredient, which is preferably a fruit pulp, and in which any desired flavoring ingredients, such as sugar and salt, have been dissolved. The resulting composition is then canned, and subsequently sterilized at a temperature not exceeding 212° F., the time required for sterilization being in the normal range used for acid products. As pointed out above, during the sterilizing operation a further interaction or transfer of acidity occurs so that all the ingredients have a uniform average acidity at the end of the sterilization operation. The resulting product will keep safely and is of excellent quality.

While I have described my invention in connection with a preferred form of product, and a preferred manner of carrying out the process employed in obtaining the product, it will be understood that the process and the product thereof can be varied without departing from the scope of my invention, which should be limited, therefore, only by the scope of the claims appended hereto.

I claim:

1. The process of preparing a canned rice product that comprises cooking from 9% to 12% of dry rice in from 30% to 40% fruit pulp of an acid character at a temperature of substantially 212° F. for a period of from 12 to 30 minutes to modify the starch content of the rice by partial inversion to dextrins, canning the resulting mixture, and sterilizing the canned mixture at a temperature not exceeding 212° F., the proportions of the rice and the fruit pulp providing a pH value of the sterilized mixture below 4.5.

2. The process of preparing a canned rice product that comprises cooking rice in a fruit pulp of an acid character at a temperature of substantially 212° F. for a period of from 12 to 30 minutes to modify the starch content of the rice by partial inversion to dextrins, canning the resulting mixture, and sterilizing the canned mixture at a temperature not exceeding 212° F., the proportions of the rice and the fruit pulp providing a pH value of the sterilized mixture below 4.5.

3. The process of preparing a canned rice product that comprises cooking rice in a buffered acid ingredient to modify the starch content of the rice by partial inversion to dextrins, canning the resulting mixture, and sterilizing the canned mixture at a temperature not exceeding 212° F., the proportions of the rice and the acid ingredient providing a pH value of the sterilized mixture below 4.5.

4. The process of preparing a canned rice product that comprises cooking the rice in an acid ingredient to modify the starch content of the rice by partial inversion to dextrins, canning the resulting mixture, and sterilizing the canned mixture at a temperature below the temperature of boiling water to destroy any spoilage organisms therein, the proportions of rice and acid ingredient providing a pH value of the sterilized mixture below 4.5.

5. The process of preparing a canned rice product that comprises cooking the rice in an acid ingredient to modify the starch content of the rice by partial inversion to dextrins, canning the resulting mixture, and sterilizing the canned mixture.

6. The process of preparing a canned rice product that comprises mixing rice and an acid ingredient, canning the mixture, and sterilizing the canned mixture at a temperature not exceeding 212° F., wherein the total time of heating of the mixture with relation to the temperature is controlled to effect a modification of the starch content of the rice by partial inversion to dextrins, and wherein the proportion of rice and acid ingredient provides a pH value of not over 4.5 in the mixture after sterilization.

7. The process of preparing a canned rice product that comprises canning a mixture of cooked rice and an acid ingredient, and sterilizing the canned mixture at a temperature below the temperature of boiling water to destroy any spoilage organisms therein, the proportion of cooked rice and acid ingredient providing a pH value of the sterilized mixture below 4.5.

8. The process of preparing a canned rice product that comprises canning a mixture of from 40% to 52% cooked rice and an acid ingredient of an amount to provide a pH value of the mixture after sterilization of below 4.5, and subjecting the canned mixture to a temperature below the temperature of boiling water to destroy any spoilage organisms therein.

9. The process of preparing a canned rice product that comprises canning a mixture of from 40% to 52% cooked rice and from 30% to 40% fruit pulp of an acid character, and subjecting the canned mixture to boiling water sterilization to destroy any spoilage organisms therein.

10. The herein described canned fruit-rice product comprising a canned mixture of cooked rice and fruit pulp having a pH value after sterilization of below 4.5.

11. The herein described canned rice product, comprising a canned, sterilized mixture of cooked rice and an acid ingredient having a pH value of below 4.5, wherein a part of the starch content of the rice is modified by the acid ingredient to form dextrins, the product being characterized by the natural cooked rice color and the individual character of the rice grains.

12. The herein described canned rice product, comprising a canned, sterilized mixture of cooked rice and a fruit pulp having a pH value of below 4.5, wherein a part of the starch content of the rice is modified by the acid ingredient to form dextrins, the product being characterized by the natural cooked rice color and the individual character of the rice grains.

PAUL C. WILBUR.